United States Patent
Hannum et al.

(10) Patent No.: US 6,618,803 B1
(45) Date of Patent: Sep. 9, 2003

(54) SYSTEM AND METHOD FOR FINDING AND VALIDATING THE MOST RECENT ADVANCE LOAD FOR A GIVEN CHECKLOAD

(75) Inventors: David P Hannum, Fort Collins, CO (US); Rohit Bhatia, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/510,282

(22) Filed: Feb. 21, 2000

(51) Int. Cl.[7] .................... G06F 9/312; G06F 9/34; G06F 12/02
(52) U.S. Cl. .............. 712/225; 712/227; 712/245; 712/211; 711/214; 711/215
(58) Field of Search ............... 712/23, 223, 207, 712/227, 240, 237, 225, 245, 217, 211; 711/214, 215

(56) References Cited

U.S. PATENT DOCUMENTS 5,694,553 A * 12/1997 Abramson et al. ............ 712/23
5,826,094 A * 10/1998 Colwell et al. ............ 712/217

* cited by examiner

Primary Examiner—Daniel H. Pan (57) ABSTRACT

The present invention discloses a system and method for simultaneously identifying a most recent advanced load instruction employing a particular register and determining whether the instruction conflicts with a store instruction thereby requiring a recovery operation. Fully associative tables are advantageously employed for identifying the most recent load instruction, for comparing store instruction address information with addresses employed in advanced load instructions, and for logging a validity status associated with a register number. Parallel operation of load vs. check register numbers and load instruction and store instruction memory addresses conserves time and preferably enables a hit/miss determination for a particular check instruction to be completed in single machine cycle.

15 Claims, 3 Drawing Sheets

SYSTEM AND METHOD FOR FINDING AND VALIDATING THE MOST RECENT ADVANCE LOAD FOR A GIVEN CHECKLOAD

RELATED APPLICATIONS

Reference is hereby made to concurrently filed, and commonly assigned U.S. patent applications application Ser. No. 09/510,278, filed Feb. 21, 2000, entitled "MECHANISM FOR DATA FORWARDING"; application Ser. No. 09/510,128, filed Feb. 21, 2000, entitled "SYSTEM AND METHOD FOR RESETTING AND INITIALIZING AN ALAT TO A KNOWN STATE AT POWER ON OR THROUGH A MACHINE SPECIFIC STATE"; and application Ser. No. 09/510,288, filed Feb. 21, 2000, entitled "SYSTEM AND METHOD FOR EFFICIENTLY UPDATING A FULLY ASSOCIATIVE ARRAY" which disclosures are incorporated herein by reference.

TECHNICAL FIELD

This invention relates in general to re-ordering or advancing load operations in a computer program and in particular to a mechanism for determining whether an advance load has been invalidated by a subsequent store operation.

BACKGROUND

It is generally desirable to reorder selected instructions in a computer program to improve program execution efficiency. One form of such reordering is that of moving or speculating instructions which load data from certain memory locations as well as instructions which may use the data received in the load instructions with respect to store instructions. A hazard associated with such reordering may exist where a store instruction, which succeeds the speculated load instructions and instructions using loaded data ("use" instructions), accesses the same memory location as one or more speculated load instructions. In this case, the speculation will generally have had the effect placing incorrect data into registers accessed by the speculated instructions. Where such a conflict occurs, execution of the load instruction and any "use" instructions (instructions using the loaded data) will be invalidated and undone. Recovery will generally be executed which may include canceling, re-fetching, and re-executing the instructions rendered invalid by the conflict with the store operation.

One prior art approach to responding to such a conflict arising from a speculation is to allow the store instruction which conflicts with the speculated load instruction to become the oldest instruction in a pipeline and retire, while instructions after the store are canceled, re-fetched, and re-executed once the store instruction has been committed to a cache or memory hierarchy.

One problem arising in the prior art is that there is generally no software control over the storing, loading, and reordering operations at run-time. Another problem is that the use of hardware imposes limitations on the instruction window size, thereby limiting the available code optimizations. Furthermore, there is a generally a large recovery penalty in the prior art, where the extent of such penalty generally depends upon the way in which the hardware implements the optimization process.

Therefore, it is a problem in the art that hardware optimization implementations must generally perform optimizations within a limited instruction window size.

It is a further problem in the art that a large recovery penalty results in a hardware controlled optimization process.

It is a still further problem in the art that there is there is generally no software control over the storing, loading, and re-ordering operations at run-time.

SUMMARY OF THE INVENTION

These and other objects, features and technical advantages are achieved by a system and method which splits original load instructions into advanced load instructions and check instructions. The advanced load instructions are preferably placed in a more advanced location in a code sequence than corresponding original load instructions and operate to load data. Each check instruction preferably operates to check the validity of advanced load instructions employing a particular register, identifies the most recent advanced load instruction employing that register, and validates the identified most recent advanced load instruction by comparing it to store instruction address information pending in an instruction queue or pipeline. Where no match is found with store instruction address information, the speculation is preferably considered to have succeeded, thereby indicating that the placement of the advanced load instruction did not conflict with any store instruction and that the speculation of this advanced load instruction was therefore successful. Generally, upon splitting an original load instruction, as mentioned above, an advanced load instruction corresponding to the original load instruction is placed before a selected store instruction, and a check instruction corresponding to the original load instruction is kept in the location of the original load instruction in an optimized code sequence.

Identification of the Most recent advanced load instruction and validation of this advanced load instruction against store address information are preferably accomplished independently and in parallel, thereby preferably improving overall cycle time and effecting transmission of conflict information (the "hit" or "miss" status of a comparison with store address information) to an exception handling unit early enough to initiate recovery.

Preferably, one or more tables are employed for storing information associated with advanced load instructions. The tables employed for this purpose are preferably fully associative, thereby enabling comparisons of one datum such as a store instruction memory address with any data entry stored in the table. Fully associative tables also preferably enable register numbers and memory addresses to be stored anywhere in the table, thereby obviating a need to index the table according to register number. In a preferred embodiment, data preserved in association with an advanced load instruction may include the register number to which an instruction loaded data, the memory address from which the data was loaded, and a log of the validity status of the advanced load instruction. Such information may be kept in a single table, or stored in corresponding locations in a plurality of separate tables.

Generally, two results are possible when an advanced load instruction is checked for conflict with store memory addresses. Specifically, the check may be a "hit" or a "miss." Herein, a "hit" refers to a case where the advanced load instruction does not conflict with known store instruction addresses, and the advanced or re-ordered load instruction may remain in its modified location without causing any adverse side effects for overall program execution. Herein, a "miss" refers to a case where the memory address associated with an advanced load instruction does conflict with a store instruction memory address. A "miss" generally triggers one of two possible responses. A first response preferably includes issuing a reload of the data as part of the check operation. A second response preferably causes a re-steer to recovery code which recovery code implements a reload of the data and re-execution of instructions which employed loaded data. Herein, the term speculated load instruction generally refers to an advanced load instruction.

Therefore, it is an advantage of a preferred embodiment of the present invention that table storage is fully associative, thereby enabling flexible placement of entries in the table.

It is a further advantage of a preferred embodiment of the present invention that software control of the optimization process enables deployment of an instruction window of unlimited size.

It is a still further advantage of a preferred embodiment of the present invention that software control of the recovery process conserves execution time.

It is a still further advantage of a preferred embodiment of the present invention that parallelizing the comparison processes for addresses and register numbers (or register identifications) enables communication of a hit/miss status for a check operation on an advanced load instruction to an exception handling unit early enough for a processor to contain any errors arising from a use of invalid loaded data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
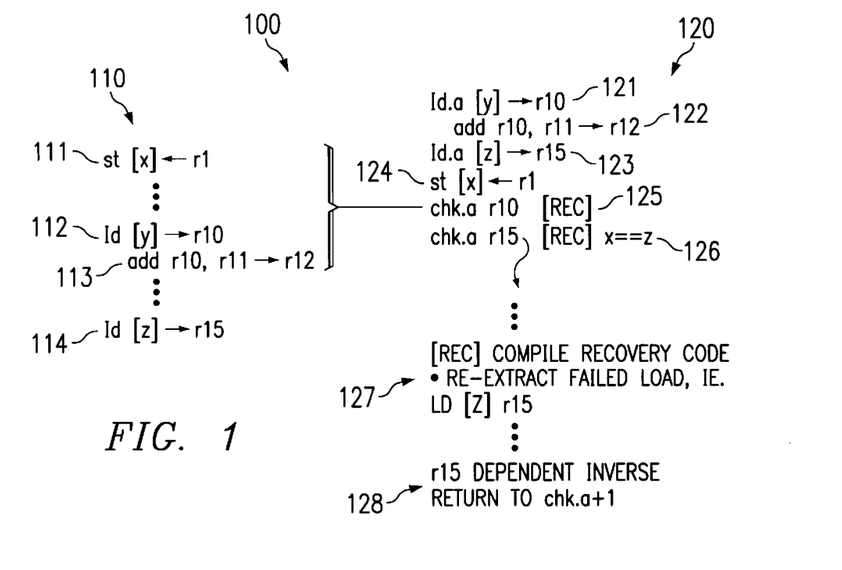
FIG. 1 depicts a sample sequence of original code and an associated sequence of optimized code.

FIG. 1 depicts an code optimization process 100 including a sample sequence of original code 110 and an associated sequence of optimized code 120. Instruction 111 operates to store the contents of R1 (register 1) to a memory location represented by the variable "x." Instruction 112 loads data from memory location "y" into register R10.

Instruction 113 is an example of a "use" of the data loaded to R10. In this case, instruction 113 operates to add the contents of R10 (just loaded from memory location y) to the contents of R11 and store the result in R12. Further along in the execution stream of sample code sequence 110 is instruction 114 which operates to load data from memory location "z" into R15. Generally, a compiler presented with code sequence 110 may not know whether the memory location values x, y, or z are the same or not at this stage of compilation. Herein, an advanced load instruction may be referred to employing the abbreviations "load.a" or "ld.a," and a check instruction may be referred to employing the abbreviations "check.a" or "chk.a."

Optimized code sequence 120 represents one possible approach to optimizing the original code sequence 110. Generally, each load instruction in original code 110 which the compiler may wish to speculate is used to generate two entries in optimized code 120: an advance load or "load.a" instruction, and a "check.a" or check instruction. Generally, the compiler inserts a check instruction for a given target register in place of an original load instruction in the program location in which the original load instruction was located. The compiler generally also adds a load.a instruction to the optimized code 120 and places this instruction as far in advance as possible, in program execution sequence, of a store instruction for two basic purposes. The first purpose is generally to hide any memory latency experienced by the advanced load instruction. The second purpose is generally to advance (re-order upward in program execution flow) any instructions which use data acquired by the pertinent advanced load instruction. One example of an instruction which uses such acquired data is the add instruction 113 in original code sequence 110.

Continuing with the example, it may be seen that the ld.a [y] instruction 121 corresponding to ld [y] instruction 112 in the original code has been placed in advance of the store instruction 124 in optimized code 120. The ld.a [y] instruction 121 operates much like original ld [y] instruction 112, but ld.a [y] 121 is a speculative load instruction. The "add" instruction 113 from the original code, is placed after the ld.a [y] instruction in the optimized code and is indicated by reference numeral 122. The speculative ld.a [z] instruction is also placed ahead of the st [x] instruction 124 in optimized code sequence 120. Generally, the store instruction 124 is left in the same position as corresponding store instruction 111 in the original code sequence 110.

Generally, when generating optimized code sequence 120, the compiler creates a recovery code sequence in the event of a conflict between a store instruction memory address and a memory address associated with a speculative load instruction. A reference to such a recovery code sequence is indicated by reference numeral 127. Generally, a recovery code sequence will include re-executing the advanced load instruction having a conflicting address as well as instructions using data acquired in the pertinent advanced load instruction, and branching back to a point in execution of the optimized code after a check.a instruction at which the conflict was detected. Generally, an address conflict is detected by steps which may include employing a check.a instruction associated with a advanced load instruction. Reference numeral 128 points to a code section which includes "return to chk.a +1" indicating a branch to an instruction in optimized code sequence 120 succeeding the check instruction involving R15 (reference numeral 126). Generally, the purpose of recovery code is to preserve program behavior.

Figure 2:
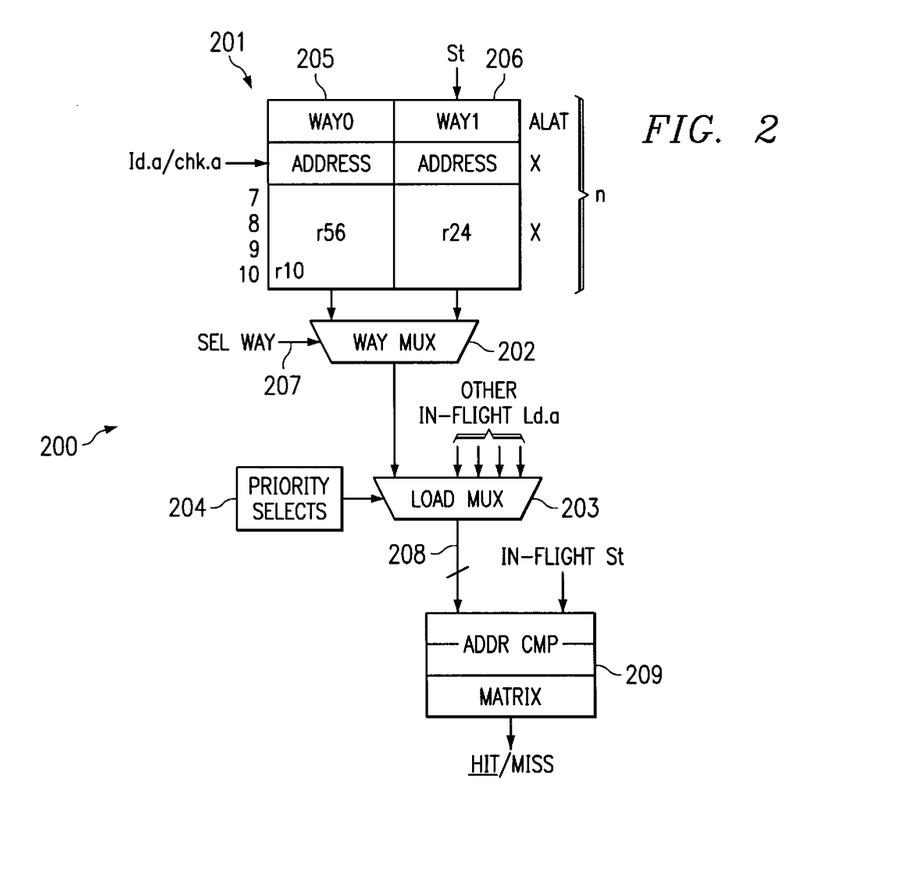
FIG. 2 depicts a mechanism for identifying conflicts between an advanced load instruction and a store instruction employing a two-way set associative implementation.

FIG. 2 depicts a mechanism 200 for identifying conflicts between an advanced load instruction and a store instruction employing a two-way set associative implementation. ALAT (advanced load address table) 201 is generally employed for storing addresses associated with advanced load instructions, which addresses are generally indexed according to register number. The ALAT 201 generally includes two "ways" or paths 205 and 206 for addresses stored in ALAT 201. Generally a four bit representation is employed to identify the index number of a memory address stored in ALAT 201.

Generally, an entry is created by placing a memory address associated with an advanced load instruction in a table location corresponding to an index position which corresponds to the register number employed in the pertinent advanced load instruction. The number of bits used to designate an entry location is generally determined by the amount of space available in the table. For example, where the table may contain 16 entries, a 4 bit representation will generally be employed.

Generally, the information stored in each entry in ALAT 201 includes a memory address, a tag, and a selection of bits from the register i.d. A "tag" is a datum which is derived from either a memory address or register i.d. and which substantially uniquely defines such memory address or register i.d. For example, where 40 bit memory addresses are concerned, 20 bits of the full 40 bits may be stored in a tag associated with a particular memory address. There is generally a tradeoff between the space required to store the tags and the possibility of conflict between tags representing different memory addresses. The information stored in each entry may further include type and frame bits associated with each entry.

An exemplary case may involve advanced load instructions associated with register numbers R8, R24, and R56. The availability of two separate ways, way0 205 and way1 206, generally enables two entries to be entered into the table where the two entries are associated with the same 4 bit value. However, the three listed registers have the same lower 4 bits and the table will therefore not be able to store the memory addresses associated with all three of registers 8, 24, and 56 simultaneously. Generally, when there is an attempt to introduce a third entry with a register i.d. having the same 4 bit sequence, one of the prior entries will have to replaced to make room for the most recent entry.

Generally, when a check instruction is encountered in program execution, the register number associated with the check instruction is communicated to ALAT 201 causing memory addresses stored in both ways 205 and 206 of ALAT 201 to be directed toward WAY MUX 202. Generally, at WAY MUX 202, a correct WAY is selected 207 according to the register number, and a resulting address is generally directed toward LOAD MUX 203. LOAD MUX 203 generally operates to select between memory addresses associated with a table entry advanced load instruction discussed above and addresses associated with in-flight advanced load instructions in order to provide a final address 208 to address compare matrix 209. Address compare matrix 209 generally operates to compare final addresses 208 to memory addresses accessed by in-flight store instructions to generate a hit/miss determination for a particular check.a or load check instruction. It is noted that address compare matrix 209 depicted in FIG. 2 is different from compare matrix 305 depicted in FIGS. 3 and 4.

One problem which may arise with the system of FIG. 2 is that of storage capacity of two way associative ALAT 201. Storage limitations, such as the one discussed above in connection with different registers having bit sequences in common, may cause valid addresses to be discarded from ALAT 201. Another problem is that the priority select operation 204 is performed serially in conjunction with MUX 203 causing addresses to be held up before being sent to the address compare matrix. Yet another problem is that the address compare matrix 209 also operates serially. The structure of FIG. 2 generally requires two machine cycles in order to make a hit/miss determination for a particular check instruction.

Figure 3:
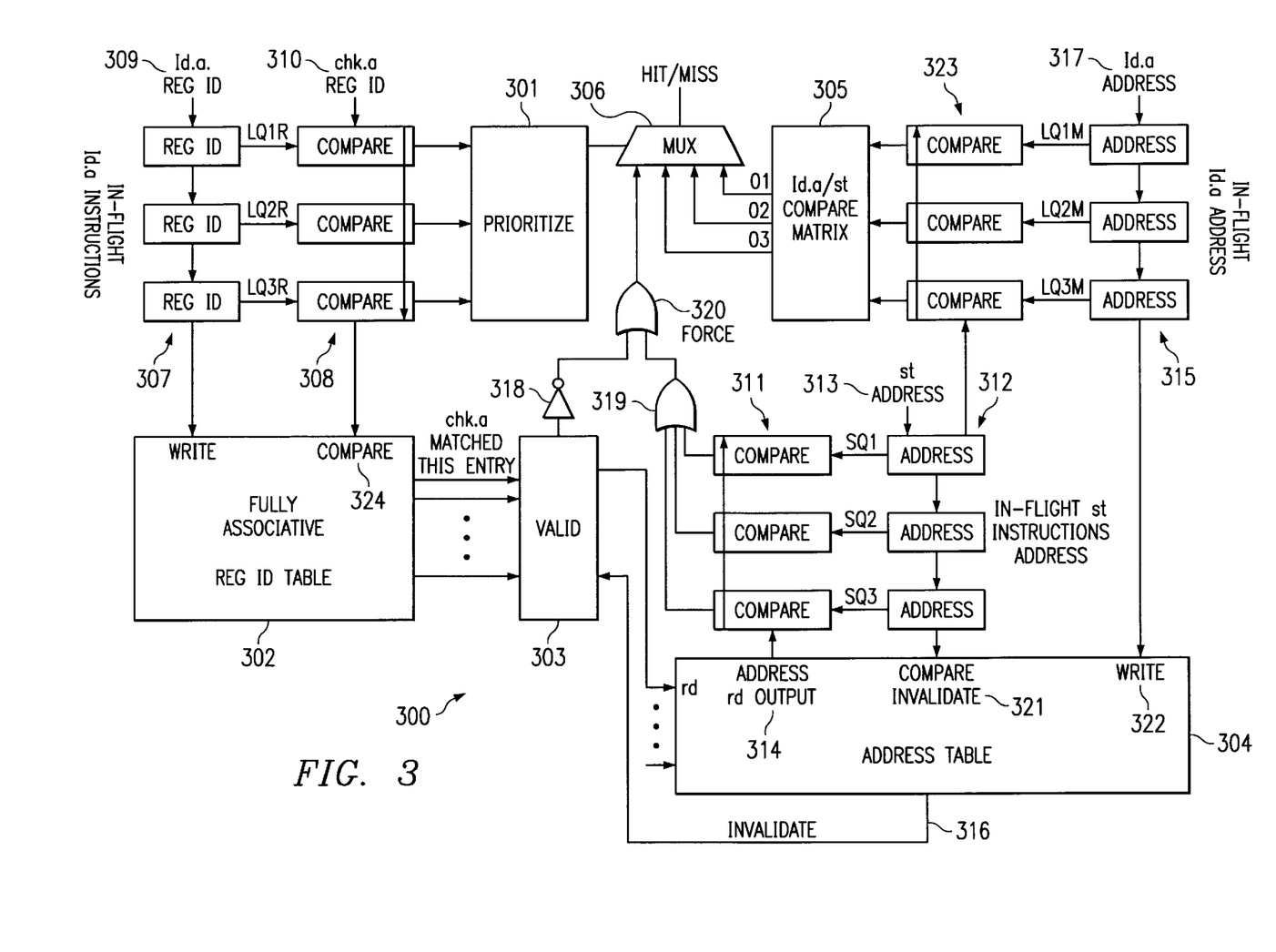
FIG. 3 is a logical block diagram of a system for simultaneous register identification and memory address comparison operations employing a fully associative table implementation according to a preferred embodiment of the present invention.

FIG. 3 is a logical block diagram of a system 300 for simultaneous register identification and memory address comparison operations employing a fully associative table implementation according to a preferred embodiment of the present invention. Herein, the term "in-flight" is generally employed to qualify instructions, register numbers associated with instructions, or memory address locations and pertains to instructions or associated data which are being processed as they arrive at a system location, as contrasted with instructions or associated data (register numbers or memory locations) which have been stored in one or more tables. The expressions LQ1R, LQ2R, and LQ3R indicate communication of advanced load instruction register numbers to compare array 308. In like manner, the expressions LQ1M, LQ2M, and LQ3M indicate communication of advanced load instruction memory addresses to compare array 323. For each of numerals 1, 2, and 3, the corresponding LQ#R and LQ#M (where "#" may represent any of 1, 2, or 3) expressions pertain to different data components of the same advanced load instruction.

Herein, the term "success status" generally refers to the status of an advanced load instruction memory address with respect to a set of store instruction memory addresses. The term "successful" as applied to an advanced load instruction preferably indicates that an advanced load instruction address memory address does not conflict with any store instruction memory addresses, and the term "unsuccessful" as applied to an advanced load instruction generally indicates that an advanced load instruction memory address does experience a conflict with a store instruction memory address.

In a preferred embodiment, system 300 operates to determine whether a hit or a miss is experienced in response to processing of a check instruction. A hit generally results where no conflict exists between an advanced load instruction memory address associated with a check instruction and a subsequent store instruction memory address. A miss generally results where a conflict does exist between an advanced load instruction memory address associated with a check instruction and a subsequent store instruction memory address. Preferably, a check instruction is employed to determine whether a memory address conflict has occurred between an advanced load instruction and a store instruction. Check instructions are preferably employed to identify a register number and corresponding memory address for the purpose of comparing an advanced load instruction memory address and potentially conflicting store instruction memory addresses. In order to ensure that potential memory conflicts are not missed by the inventive system, comparisons are preferably conducted with both tabulated as well as in-flight data associated with various instructions.

In a preferred embodiment, check instruction register ids (or register numbers) 310 arrive at the system 300 and are broadcast through register id compare array 308. Preferably, each register address 310 is instantaneously broadcast to all three compare locations in compare array 308 as well as to the compare operation 324 with table 302. Preferably, two sets of comparisons with advanced load instructions are performed for incoming check instruction register i.d.s 310. A first set of comparisons is preferably performed with register id pipeline 307, and a second set of comparisons is preferably performed with entries in table 302. The two sets of comparisons are preferably performed simultaneously.

In a preferred embodiment, incoming check instruction register numbers 310 are compared with incoming, or in-flight, advanced load instruction register numbers 309 which are transmitted along advanced load instruction register number pipeline 307. Preferably, matches resulting from the "compare" operations depicted in check instruction compare array 308 are preserved in a location depicted by "prioritize" functional block 301. As the advanced load instruction register numbers proceed along advanced load instruction register number pipeline 307, they are preferably written into register i.d. table 302 and stored there for comparison with check instruction register numbers. It will be appreciated that pipeline 307 and compare array 308 may be configured to conduct fewer or more than three compare operations simultaneously, and all such variations are included within the scope of the present invention.

Preferably, the prioritize function 301 operates to preserve the identity of a most recent advanced load instruction which matches a particular check instruction register number. Preferably, the prioritize function 301 operates to select an input to MUX 306 employing information associated with a matching register number. Prioritize function 301 preferably identifies the most recent match among matches occurring in compare array 308 and encodes the most recent match for communication to MUX 306.

In a preferred embodiment, fully associative data tables are employed to store data accumulated from a series of past advanced load instructions. In the embodiment of FIG. 3, three related data tables 302, 303, and 304 are employed to store such accumulated data. Preferably, for each advanced load instruction received at system 300, one data field is stored in each of tables 302, 303, and 304. Preferably, the advanced load instruction's register number is stored at a designated table location in reg. id table 302, a validity status of the advanced load instruction in a corresponding location in "valid" table 303, and the memory address accessed by the advanced load instruction at a corresponding location in address table 304. Table locations may be indexed by a variety of means and need not be assigned in register number order. Fully associative tables also preferably provide the inventive mechanism with the ability to locate information anywhere in the tables. Although information associated with advanced load instructions is depicted as distributed among three tables in the embodiment of FIG. 3, it will be appreciated that a single table employing multiple fields for each index location within the table may be employed to store all information pertaining to the advanced load instructions in such a single table. Alternatively, two tables, or four or more tables may be employed, and all such variations are included within the scope of the present invention. It will also be appreciated that tables 302, 303, and 304 may include any number of entries.

In a preferred embodiment, information stored in each entry in table 304 includes a memory address or a tag. Preferably, a "tag" is a datum which is derived from either a memory address or register i.d. and which substantially uniquely defines such memory address or register i.d. For example, where 40 bit memory addresses are concerned, 20 bits of the full 40 bits may be stored in a tag associated with a particular memory address. There is generally a tradeoff between the space required to store the tags and the possibility of conflict between tags representing different memory addresses.

In a preferred embodiment, in order to establish that an advanced load instruction memory address is a "hit" which does not conflict with a store instruction memory address, a check instruction will perform a set of comparisons to ensure that the advanced load instruction does not conflict with any previously logged store instruction memory addresses or with any in-flight store instruction memory addresses. Preferably, each advanced load instruction is described by three data fields, wherein one of the three data fields is stored in each of the three tables 302, 303, and 304. Each check instruction may employ one or more of these three data fields in order to establish the hit or miss status of a check instruction.

In a preferred embodiment, check instruction i.d. 310 is compared with register i.d.s resident in register i.d. table 302. Table 302 may include a plurality of register id entries representing a plurality of speculated advanced load instructions. The register i.d.s need not be indexed according to their actual register numbers. Upon matching an entry in register i.d. table 302, the inventive mechanism proceeds to determine the validity of the register i.d. found in table 302 by examining a status of a validity bit in "valid" table 303. The validity bit corresponding to the register i.d. matched in table 302 is preferably located at a location in table 303 which corresponds to the location of the matched register i.d. entry in table 302. Generally, a "set" condition for the validity bit indicates validity and a "reset" condition indicates invalidity of the advanced load instruction associated with the respective table entries. If the pertinent table entry is invalid, then the pertinent advanced load instruction has conflicted with a store instruction, and a "miss" condition results. However, a "valid" condition of the validity bit is generally not by itself sufficient for a "hit" condition to prevail, since a memory address associated with the speculated advanced load instruction being checked is preferably also compared with in-flight store instruction memory addresses which may independently generate a "miss" condition even if the validity bit in valid table 303 was set for the pertinent advanced load instruction.

In a preferred embodiment, a valid condition for an advanced load instruction generally indicates that no previously received store instruction address has conflicted with the memory address for the advanced load instruction being checked. However, it remains to check the memory address of the pertinent advanced load instruction against pending, or in-flight, store instruction memory addresses. Therefore, upon establishing that the validity bit for an advanced load instruction is "set" in the "valid" table 303, the inventive mechanism causes a memory address associated with the advanced load instruction being checked to be "popped" or output 314 from address table 304 in order to be compared with in-flight store instruction memory addresses in store instruction address pipeline 312. Generally, an advanced load instruction memory address is in a location in table 304 which corresponds to the table locations in tables 302 and 303 of the register i.d. and validity bit, respectively, associated with the same advanced load instruction.

In a preferred embodiment, an appropriate advanced load instruction memory address 314 emerges from table 304, and is broadcast simultaneously to the three compare locations in compare array 311 for comparison with addresses in in-flight store instruction address pipeline 312. Generally, for a "hit" condition to exist, the advanced load instruction should have a "set" bit in the appropriate valid table 303 entry, and should have a memory address entry in table 304 which does not match any of the addresses in in-flight store instruction address pipeline 312. Effectively, this combination of conditions indicates that the advanced load instruction memory address does not conflict with any store instruction memory address previously written 322 to table 304 or with any in-flight store instruction addresses currently pending in system 300.

In a preferred embodiment, the logic of the connections between valid table 303, OR gate 310 and OR gate 320 is as follows. Generally, a valid condition in valid table 303 has a logical value of 1, a match address table output 304 and an in-flight store instruction address generates a logical "1," and a resulting "miss" condition has a logical value of 1. In the embodiment of FIG. 3, where the valid bit is "1", the output from inverter 318 will be a logical "0." Where no match occurs between table output 304 and the in-flight store addresses, all inputs to OR gate 319 will have a value of logical "0." In this case, both inputs to OR gate 320 will be logical "0" and the output toward MUX 306 will be logical "0" indicating a HIT condition. If either the valid bit is in a reset condition, or any of the address output/in-flight store address comparisons match, the output of OR gate 320 will be a logical 1 indicating a MISS condition. It will be appreciated that the sequence of logical connections and gates depicted in FIG. 3, and the logic level conventions associated with particular system conditions represents but one exemplary embodiment of the present invention. It will be further appreciated that the inventive mechanism may be implemented with a variety of logical devices, arrangements, and conventions for assigning logical values to certain system conditions, and that all such variations are included within the scope of the present invention.

In a preferred embodiment, in addition to the comparisons discussed above, addresses in in-flight advanced load instruction memory address pipeline 315 are compared with in-flight store instruction memory address 313. In-flight store instruction memory address 313 is preferably simultaneously broadcast to all three compare locations of compare array 323 for simultaneous comparison with three consecutive addresses within in-flight advanced load instruction pipeline 315. Preferably, the comparison operations in compare array 323 generate load.a/store compare matrix 305, the results of which are fed into MUX 306 for a HIT/MISS determination.

In a preferred embodiment, in addition to being compared with in-flight store instruction addresses 312, in flight advanced load instruction addresses are written 322 into address table 304. Table 304 preferably stores advanced load instruction addresses accumulated over a plurality of advanced load instruction memory address write operations 322. As in-flight store instruction memory addresses complete a comparison with addresses output 314 from address table 304, the store instruction addresses are compared 321 with the entries in address table 304. Preferably, any entry in table 304 which matches an incoming store instruction address is thereafter considered invalid. The invalid status of the matched memory address is preferably logged by adjusting a valid bit in table 303 which corresponds to the now invalid memory address entry in table 304. A preferred mechanism for modifying the valid bit is indicated by invalidate instruction 316 shown going from table 304 to table 303.

An exemplary application of system 300 to the sample optimized code depicted in FIG. 1 is discussed in the following. The instruction load.a [y]→R10 121 (FIG. 1) is preferably processed by sending the register i.d. for this advanced load instruction down pipeline 307 and the memory address, "y", down pipeline 315. The register i.d., in this case, R10, will preferably progress through pipeline 307 and eventually get written into register i.d. table 302, which table is preferably fully associative. The advanced load instruction memory address, "y", is preferably simultaneously transmitted along pipeline 315 and is eventually written into address table 304. The address table 304 is preferably also fully associative. While in progress through pipeline 315, memory address Y is preferably compared with in-flight store addresses to determine whether a conflict exists. In this exemplary case, there are no conflicting in-flight store addresses.

Preferably, once the register i.d. and memory address fields of advanced load instruction 121 (FIG. 1) reach tables 302 and 304, respectively, a valid bit is preferably set for this instruction in valid table 303. The register i.d., valid bit, and memory address associated with the above-referenced advanced load instruction are preferably stored in corresponding table entry locations in tables 302, 303 and 304, respectively, thereby establishing three separate data fields for the advanced load instruction 121 in system 300. Generally, the valid bit is set to a "valid" status (which may be a logical 1 or 0 depending upon a design preference) by default upon first receiving the various fields for an advanced load instruction at system 300. The status of the valid bit in valid table 303 may subsequently be changed in the event that a conflicting store instruction is received at address table 304.

Preferably, the second advanced load instruction 123 in the optimized code of FIG. 1, having a register i.d. of 15 and a memory address of "z" will be processed by system 300 in the same manner described above in connection with advanced load instruction 121 (FIG. 1). As with the first advanced load instruction, there will preferably be no conflicting in-flight store instruction addresses, and the register i.d. and memory address for this advanced load instruction will be appropriately written to tables 302 and 304 respectively. Preferably, a valid bit for this second advanced load instruction will be set to "valid" in valid table 303.

Continuing with the example, the store instruction 124 (FIG. 1) is received by system 300, is compared with in-flight advanced load addresses 315, and then compared with entries in address table 304. The store instruction 124 accesses memory location "z." For the sake of simplicity, it is assumed that the prior advanced load instruction entries are not in-flight when the store instruction arrives, but are rather already stored in their respective tables. In the example of FIG. 1, the values of "x" and "z" are equal. Accordingly, when the store instruction is compared 321 with the entries in address table 304, the address for store instruction 124 should match the address entry for advanced load instruction 123 stored in the address table 304. Once this match, or conflict, is discovered, the address entry found to conflict with the store instruction address is invalidated. This invalidation preferably includes transmitting an invalidate request or instruction 316 to the valid table 303 to reset the validity bit for the appropriate entry in valid table 303 to indicate the invalid status of conflicting memory address "z" in table 304.

Continuing with the example, a check instruction 125 (FIG. 1) associated with register 10 will be performed and will preferably find no conflict. Preferably, the check instruction 125 will match with the register 10 entry in table 302. Next, the validity status of the bit in a location in table 303 corresponding to the table location for the register 10 entry in table 302 will be examined. Preferably, the validity bit will indicate a "valid" status generally indicating that no store instruction memory address previously received at table 304 has conflicted with the memory address associated with the register 10 entry. It remains to check for conflict of the tabulated memory address corresponding to the register 10 entry with addresses in in-flight store instruction address pipeline 312. Accordingly, the check instruction causes a memory address in table 304 corresponding to the register 10 entry in table 302 to be popped, or transmitted out of table 304 for comparison with in-flight store instructions. In this case, there will preferably be no conflict with in-flight store instructions, and a "hit" condition will be indicated for this set of entries. This "hit" condition preferably indicates that the memory address of the speculated advanced load instruction represented by the three data fields (register i.d., validity status bit, and memory address) in the three tables (which are preferably fully associative) did not conflict with either previously received store instruction memory addresses or with any in-flight store instruction memory addresses and that the speculation of the advanced load instruction was therefore successful.

Continuing with the example, a check instruction 126 (FIG. 1) associated with register 15 will be processed by system 300. As has been previously discussed, memory address "z" conflicted with memory address "x" associated with store instruction 124 (FIG. 1), thereby establishing an invalid status for a table entry in table 303 which corresponds to the table entry for register 15 in table 302. Accordingly, check instruction 126 will preferably be compared with the entries in table 302, find an entry for register 15, and identify a table location for this entry. The check instruction will then preferably check the status bit for a corresponding table location in table 303 and find this status bit to be invalid. Since the entry is invalid, a "miss" condition will preferably be generated for the register 15 entry, thereby indicating that the advanced load instruction associated with this register entry conflicted with a store instruction memory address, and that this speculative load instruction was therefore unsuccessful. Preferably, appropriate recovery code is then executed to re-execute the advanced load instruction and any "use" instructions dependent on the speculated advanced load instruction.

In a preferred embodiment, the system of FIG. 3 presents certain advantages over the system of FIG. 2. The preferably fully associative tables 302, 303, and 304 of FIG. 3 enable comparison of incoming data, whether register i.d. or address, to be compared with any entry in the table. In contrast, the two-way associative implementation depicted in FIG. 2 is generally limited to comparing one entry with one other entry within a table. The parallel compare operations implemented in the system of FIG. 3 generally operate to conserve processing time in comparison with the system of FIG. 2. Further, the "way" MUX, present in the system of FIG. 2, is eliminated in the system of FIG. 3, thereby preferably providing for hardware reduction and faster response time. Still further, in the system of FIG. 3, the tables are preferably not indexed by register number, thereby avoiding the limitation discussed in connection with FIG. 2 wherein there was a limit on the number of register numbers having a particular set of bits in common which could be simultaneously stored in the same table. Still further, the system of FIG. 3 is preferably able to complete load/store comparison and hit/miss determination for a check instruction in one machine cycle.

Figure 4:
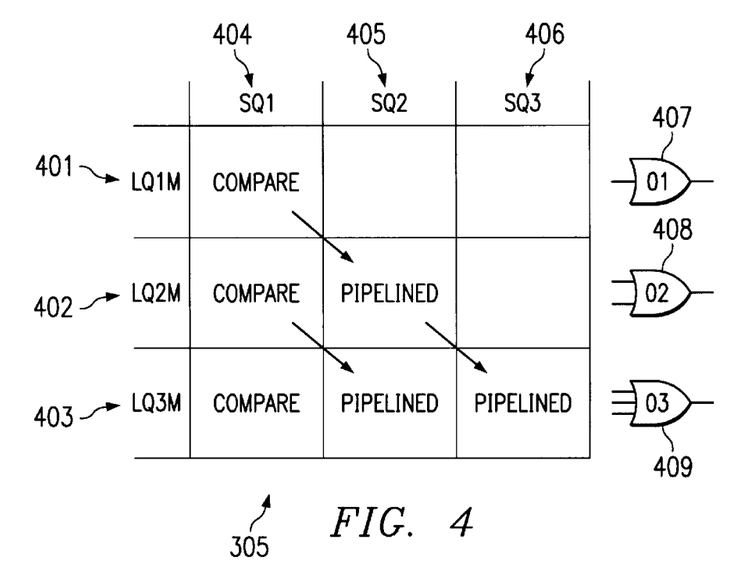
FIG. 4 depicts the advanced-load/store compare matrix of FIG. 3 in greater detail.

FIG. 4 depicts the load.a/store compare matrix 305 of FIG. 3 in greater detail. The operation of load.a/store compare matrix indicated by reference numeral 305 in FIG. 3 is illustrated in greater detail in FIG. 4. Both advanced load and store addresses are shown at different stages of the pipeline feeding into the load.a/store compare matrix 305 in FIG. 3. SQ1 404 through SQ3 406 refer to store instruction addresses where the suffix numeral increases with increasing age of the address in the system. Specifically, SQ3 406 is older than SQ2 405 which, in turn, is older than SQ1 404. Similar logic applies to advanced load instruction addresses indicated by LQ1M 401 through LQ3M 403. Specifically, LQ3M 403 is older than LQ2M 402, which is older than LQ1M 401.

In a preferred embodiment, an initial comparison is performed involving SQ1 404 and LQ1M 401 and the result stored in the appropriate block of matrix 305. As the instructions advance, SQ1 becomes SQ2, and LQ1M becomes LQ2M. Preferably, the result of the SQ1/LQ1M comparison is latched and moved to an appropriate new location in matrix 305, thereby obviating a need to perform an additional comparison between the current SQ2 and current LQ2M. As the respective pipelines advance one more step, this process is preferably repeated, with the SQ2/LQ2M result becoming the result for the new SQ3/LQ3M block in matrix 305. The three arrows pointing to pipelined results preferably refer to analogous latching operations. In FIG. 4, the empty boxes generally indicate that the comparisons indicated by the advanced load and store instructions intersecting at the empty boxes occurred earlier in the order of program execution, and that no further comparison need be performed at the present stage.

In a preferred embodiment, the output for each advanced load instruction or "LQ" row represents an "or-ed" combination of results from current and past address comparisons. The "or" gates for LQ1M, LQ2M, and LQ3M are labeled 407, 408, and 409 respectively. In the case of LQ3M 403, there is one current compare result in the LQ3M/SQ1 box and two pipelined compare results. Preferably, logical values representing the results of these compare operations are fed into an "or" gate, thereby operating to generate a "matched" comparison result leading to a "miss" condition if any of the prior or current compare operations yielded a conflict between the LQ3M 403 address and any of the prior or current store instruction memory addresses.

In a preferred embodiment, the structure of the load.a/store compare matrix 305 enables a determination of prioritization to be performed in parallel to a determination of a hit/miss condition. The prioritization works by identifying the most recent advanced load/check compare operation. For example, if both the LQ1M and LQ3M register numbers match the incoming check instruction register number, then LQ1M would preferably win the prioritization because LQ1M is the most recent of the matching advanced load instruction operations. This prioritization process preferably enables a selection of an input from among a plurality of inputs to the MUX 306 for determination of a hit/miss condition. The prioritize function is depicted as "prioritize" block 301, and a selection connection is shown in the form of a line between prioritize block 301 and MUX 306.

Returning to FIG. 3, in a preferred embodiment, there are four inputs into MUX 306 which may be selected from in order to process a hit/miss determination. It will be appreciated that a number of inputs less than or more than three may be employed, and that all such variations are within the scope of the present invention. Preferably, the output from prioritize function 301 to MUX 306 operates to select the input to MUX 306 representing the most recent hit/miss determination available among the MUX 306 inputs. Generally, in-flight determinations are more recent than determinations resulting from comparisons with tables 302, 303, and 304. Therefore, an input to the MUX arising from an address table comparison will generally be selected only when there are no hit/miss determinations arising from the in-flight advanced-load/store comparisons.

Figure 5:
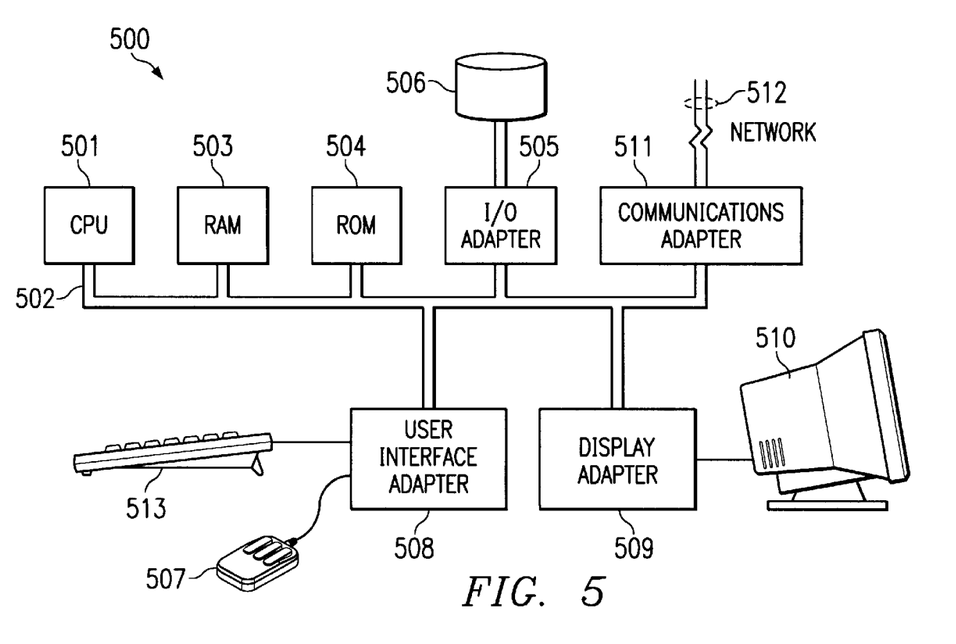
FIG. 5 depicts computer apparatus adaptable for use with a preferred embodiment of the present invention.

FIG. 5 illustrates computer system 500 adaptable for use with a preferred embodiment of the present invention. Central processing unit (CPU) 501 is coupled to system bus 502. The CPU 501 may be any general purpose CPU, such as an HP PA-8200. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

The bus 502 is also coupled to input/output (I/O) adapter 505, communications adapter card 511, user interface adapter 508, and display adapter 509. The I/O adapter 505 connects to storage devices 506, such as one or more of hard drive, CD drive, floppy disk drive, tape drive, to the computer system. Communications adapter 511 is adapted to couple the computer system 500 to a network 512, which may be one or more of local (LAN), wide-area (WAN), Ethernet or Internet network. User interface adapter 508 couples user input devices, such as keyboard 513 and pointing device 507, to the computer system 500. The display adapter 509 is driven by CPU 501 to control the display on display device 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for establishing a status of a load instruction having an associated check instruction during execution of a program, the method comprising:
  (a) comparing a register number of the check instruction with a register number of at least one in-flight load instruction to determine a most recent load instruction matching the register number of the check instruction;
  (b) comparing the register number of the check instruction with register number entries accumulated in an associative register number table;
  (c) comparing an address of the load instruction with an address of at least one in-flight store instruction;
  (d) comparing an address associated with the result of (b) with an address of the at least one in-flight store instruction; and
  (e) using the most recent load instruction to select the status from the results of (b), (c), and (d);
  wherein (a) and (b) are performed simultaneously with each other and (c) and (d) are performed simultaneously with each other.

2. The method of claim 1, wherein (e) comprises:
  indicating a successful status for the load instruction if the load instruction does not conflict with at least one store instruction; and
  indicating an unsuccessful status for the load instruction if the load instruction conflicts with at least one store instruction.

3. The method of claim 2, wherein the status is unsuccessful, the method further comprising:
  repeating the load instruction.

4. The method of claim 2, wherein the status is unsuccessful, the method further comprising:
  executing recovery code that implements a reload of the data associated with the load instruction and a re-execution of at least one instruction that used the data.

5. The method of claim 1, wherein the load instruction is an advanced load instruction, the method further comprising:
  optimizing the program by moving an original load instruction in the program to an earlier location in the program, thereby forming the advanced load instruction; and
  placing the check instruction at the location in the program of the original load instruction.

6. The method of claim 1, wherein (a), (b), (c), and (d) are performed simultaneously with each other.

7. The method of claim 1, further comprising:
  writing an entry in the associative register number table based on the register number and the address associated with the load instruction.

8. The method of claim 1, further comprising:
  writing an entry in the associative register number table based on an in-flight store instruction.

9. The method of claim 1, further comprising:
  commencing (a) upon encountering the check instruction during execution of the program.

10. A method for establishing a status of an advanced load instruction having an associated check instruction during execution of a program, the method comprising:
  (a) simultaneously comparing a register number of the check instruction with a register number of at least one in-flight load instruction and with register number entries accumulated in an associative register number table;
  (b) simultaneously comparing an address of at least one in-flight store instruction with an address of the advanced load instruction and with an address associated with the result of comparing a register number of the check instruction with register number entries accumulated in an associative register number table; and
  (c) determining the status based on (a) and (b).

11. The method of claim 10, wherein (e) comprises:
  indicating a successful status for the load instruction if the load instruction does not conflict with at least one store instruction; and
  indicating an unsuccessful status for the load instruction if the load instruction conflicts with at least one store instruction.

12. The method of claim 11, wherein the status is unsuccessful, the method further comprising:
  repeating the load instruction.

13. The method of claim 11, wherein the status is unsuccessful, the method further comprising:

executing recovery code that implements a reload of the data associated with the load instruction and a re-execution of at least one instruction that used the data.

14. A system for establishing a status of an advanced load instruction having an associated check instruction during execution of a program comprising:

first means for simultaneously comparing a register number of the check instruction with a register number of at least one in-flight load instruction and with register number entries accumulated in an associative register number table;

second means for simultaneously comparing an address of at least one in-flight store instruction with an address of the advanced load instruction and with an address associated with the result of comparing a register number of the check instruction with register number entries accumulated in an associative register number table; and third means for determining the status based on the first means and the second means.

15. A system for establishing a status of an load instruction having an associated check instruction during execution of a program comprising:

a first pipeline for storing a plurality of in-flight load instructions;

a first plurality of comparators, with each comparator associated with a stage of the first pipeline, wherein each compartor compares a register number of the check instruction with a register number of the in-flight load instruction stored in its associated stage of the first pipeline;

an associative register number table that stores a plurality of entries of information related to a plurality of load instructions, wherein the associative register number table includes a compare function that compares the register number of the check instruction with register number entries of the table;

a second pipeline for storing a plurality of in-flight store instructions;

a second plurality of comparators, with each comparator associated with a stage of the second pipeline, wherein each compartor compares an address of the load instruction with an address of the in-flight store instruction stored in its associated stage of the second pipeline;

logic that selects the status from the results of the first plurality of comparators and the second plurality of comparators.

* * * * *